(12) United States Patent
Bedworth

(10) Patent No.: US 7,725,309 B2
(45) Date of Patent: May 25, 2010

(54) SYSTEM, METHOD, AND TECHNIQUE FOR IDENTIFYING A SPOKEN UTTERANCE AS A MEMBER OF A LIST OF KNOWN ITEMS ALLOWING FOR VARIATIONS IN THE FORM OF THE UTTERANCE

(75) Inventor: Mark Bedworth, Worcestershire (GB)

(73) Assignee: Novauris Technologies Ltd. (GB)

( * ) Notice: Subject to any disclaimer, the term of this patent is extended or adjusted under 35 U.S.C. 154(b) by 973 days.

(21) Appl. No.: 11/422,406

(22) Filed: Jun. 6, 2006

(65) Prior Publication Data

US 2006/0277030 A1 Dec. 7, 2006

Related U.S. Application Data

(60) Provisional application No. 60/688,090, filed on Jun. 6, 2005.

(30) Foreign Application Priority Data

Jul. 22, 2005 (GB) ................................. 0515049.5

(51) Int. Cl.
*G06F 17/20* (2006.01)
(52) U.S. Cl. ........................................ 704/10; 704/243
(58) Field of Classification Search .................. 704/243
See application file for complete search history.

(56) References Cited

U.S. PATENT DOCUMENTS

| | | | |
|---|---|---|---|
| 4,624,010 A | 11/1986 | Takebayashi | |
| 4,748,670 A | 5/1988 | Bahl et al. | |
| 4,783,803 A | 11/1988 | Baker et al. | |
| 4,803,729 A | 2/1989 | Baker | |
| 4,866,778 A | 9/1989 | Baker | |
| 5,027,406 A | 6/1991 | Roberts et al. | |
| 5,208,897 A | 5/1993 | Hutchins | |
| 5,222,190 A | 6/1993 | Pawate et al. | |
| 5,241,619 A | 8/1993 | Schwartz et al. | |

(Continued)

FOREIGN PATENT DOCUMENTS

EP   0175503 A1   3/1986

(Continued)

OTHER PUBLICATIONS

International Search Report and Written Opinion of the International Searching Authority in International Application PCT/US04/09929, International Searching Authority United States Receiving Office, Feb. 15, 2006, 10 pages.

(Continued)

*Primary Examiner*—Susan McFadden
(74) *Attorney, Agent, or Firm*—Mahamedi Paradice Kreisman LLP

(57) ABSTRACT

An application-specific dictionary is provided that includes a plurality of entries, where each entry matches to one or more items that comprise one or more records of a record store. For at least some of the plurality of entries, each entry has multiple phonetic representations, including one or more phonetic representations that are at least one of (i) an abbreviation of that entry, or (ii) a null use of the entry when that entry is combined with another entry.

8 Claims, 4 Drawing Sheets

U.S. PATENT DOCUMENTS

| | | | |
|---|---|---|---|
| 5,465,318 | A | 11/1995 | Sejnoha |
| 5,502,790 | A | 3/1996 | Yi |
| 5,799,276 | A | 8/1998 | Komissarchik et al. |
| 5,822,730 | A | 10/1998 | Roth et al. |
| 5,920,837 | A | 7/1999 | Gould et al. |
| 6,023,677 | A | 2/2000 | Class et al. |
| 6,073,097 | A | 6/2000 | Gould et al. |
| 6,088,669 | A | 7/2000 | Maes |
| 6,122,613 | A | 9/2000 | Baker |
| 6,202,060 | B1 * | 3/2001 | Tran .............................. 707/3 |
| 6,233,553 | B1 * | 5/2001 | Contolini et al. ............ 704/220 |
| 6,253,178 | B1 | 6/2001 | Robillard et al. |
| 6,260,013 | B1 | 7/2001 | Sejnoha |
| 6,343,270 | B1 | 1/2002 | Bahl et al. |
| 6,363,342 | B2 * | 3/2002 | Shaw et al. ................. 704/220 |
| 6,501,833 | B2 | 12/2002 | Phillips et al. |
| 6,542,896 | B1 * | 4/2003 | Gruenwald ................. 707/101 |
| 6,684,185 | B1 | 1/2004 | Junqua et al. |
| 6,744,861 | B1 | 6/2004 | Pershan et al. |
| 6,804,330 | B1 * | 10/2004 | Jones et al. .............. 379/88.01 |
| 6,901,436 | B1 * | 5/2005 | Schneider ................... 709/219 |
| 6,963,841 | B2 * | 11/2005 | Handal et al. ............... 704/270 |
| 7,194,069 | B1 * | 3/2007 | Jones et al. .............. 379/88.02 |
| 7,225,130 | B2 * | 5/2007 | Roth et al. .................. 704/270 |
| 7,313,526 | B2 * | 12/2007 | Roth et al. .................. 704/270 |
| 7,403,941 | B2 * | 7/2008 | Bedworth et al. .............. 707/3 |
| 7,444,286 | B2 * | 10/2008 | Roth et al. .................. 704/270 |
| 7,467,089 | B2 * | 12/2008 | Roth et al. .................. 704/270 |
| 7,493,259 | B2 * | 2/2009 | Jones et al. ................. 704/257 |
| 7,505,911 | B2 * | 3/2009 | Roth et al. .................. 704/276 |
| 7,526,431 | B2 * | 4/2009 | Roth et al. .................. 704/270 |
| 2001/0012999 | A1 | 8/2001 | Vitale et al. |
| 2002/0196911 | A1 | 12/2002 | Gao et al. |
| 2003/0069730 | A1 | 4/2003 | Vanhilst |
| 2003/0229497 | A1 | 12/2003 | Wilson et al. |

FOREIGN PATENT DOCUMENTS

| | | |
|---|---|---|
| EP | 0907949 B1 | 6/1997 |
| EP | 0953970 A1 | 4/1999 |
| EP | 1083545 A2 | 3/2001 |
| WO | WO2004/086357 A2 | 10/2004 |

OTHER PUBLICATIONS

International Search Report and Written Opinion of the International Searching Authority in International Application PCT/GB2006/002077, International Searching Authority European Patent Office, Aug. 23, 2006, 10 pages.

Riley, Michael D. and Ljolje, Andrej, Automatic Generation of Detailed Pronunciation Lexicons, Automatic Speech and Speaker Recognition: Advanced Topics, 1995, XP-002409248, 17 pages.

Search Report from The Patent Office, Great Britain, dated Dec. 14, 2005 for related copending Great Britain Application No. GB0515049.5, 1 page.

Supplementary European Search Report for PCT/US2004/009929, Dec. 18, 2006, 5 pages.

F. Jelinek, "Statistical methods for speech recognition", 1997, Chapter 5, pp. 80-103.

Non-Final Office Action dated Jan. 11, 2006 In U.S. Appl. No. 10/401,572, 13 pgs.

X. Huang, "Spoken language processing: a guide theory, algorithm, and system development",2001,pp. 383-401 and pp. 622-639.

* cited by examiner

STANDARD DICTIONARY

| ORTHOGRAPHIC REPRESENTATION | PRONUNCIATION SPECIFICATION |
|---|---|
| JOHN | JH AA1 N |
| JOHNS | JH AA1 N Z |

FIG. 3A

(Prior Art)

APPLICATION-SPECIFIC DICTIONARY

| ORTHOGRAPHIC REPRESENTATION | PRONUNCIATION SPECIFICATION |
|---|---|
| JOHN | JH AA1 N |
| JOHN | JH AE1 K |
| JOHN | JH EY1 |
| JOHN | --- |

FIG. 3B

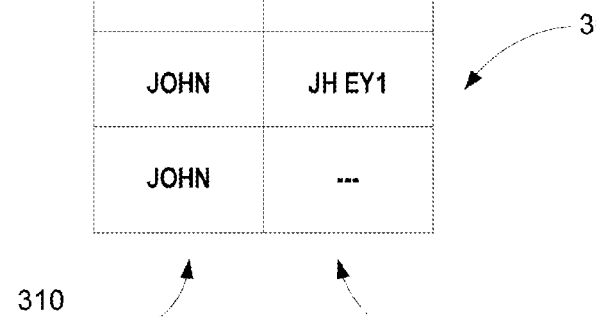

| ORTHOGRAPHIC REPRESENTATION | PRONUNCIATION SPECIFICATION |
|---|---|
| -FN- JOHN | JH AA1 N |
| -FN- JOHN | JH AE1 K |
| -FN- JOHN | JH EY1 |
| -FN- JOHN | --- |
| -SN- JOHN | JH AA1 N |
| -SN- JOHN | --- |

FIG. 3C

SYSTEM, METHOD, AND TECHNIQUE FOR IDENTIFYING A SPOKEN UTTERANCE AS A MEMBER OF A LIST OF KNOWN ITEMS ALLOWING FOR VARIATIONS IN THE FORM OF THE UTTERANCE

RELATED APPLICATION

This application claims benefit of priority to U.S. Provisional Application No. 60/688,090, filed Jun. 6, 2005, entitled "System, Method, and Technique for Identifying a Spoken Utterance as a Member of a List of Known Items Allowing for Variations in the Form of the Utterance," and naming Mark Bedworth as inventor; the aforementioned application being hereby incorporated by reference in its entirety for all purposes. This application also claims priority and incorporates by reference United Kingdom Patent Application No 0515049.5 filed Jul. 22, 2005.

BACKGROUND

Previous patent disclosures have described a basic arrangement of apparatus for spoken access to large lists of items and techniques for rapid search within such lists, particularly when they can be given a hierarchical field structure, such as is the case for names and addresses. The obvious approach to handling these variations is simply to include them in additional valid sequences. However, if all the allowed sequences were listed individually, the size of the list to be searched, and hence the computational effort, would be increased enormously. Typical variations in the US names and addresses example would increase the size of the list by over 50 times.

BRIEF DESCRIPTION OF THE DRAWINGS

FIG. 3A represents the structure and phonetic representations created under a prior art dictionary.

FIGS. 3B and 3C illustrates how pronunciations corresponding to a word may be phonetically represented in an application-specific dictionary, under embodiments of the invention.

DETAILED DESCRIPTION

Figure 1:
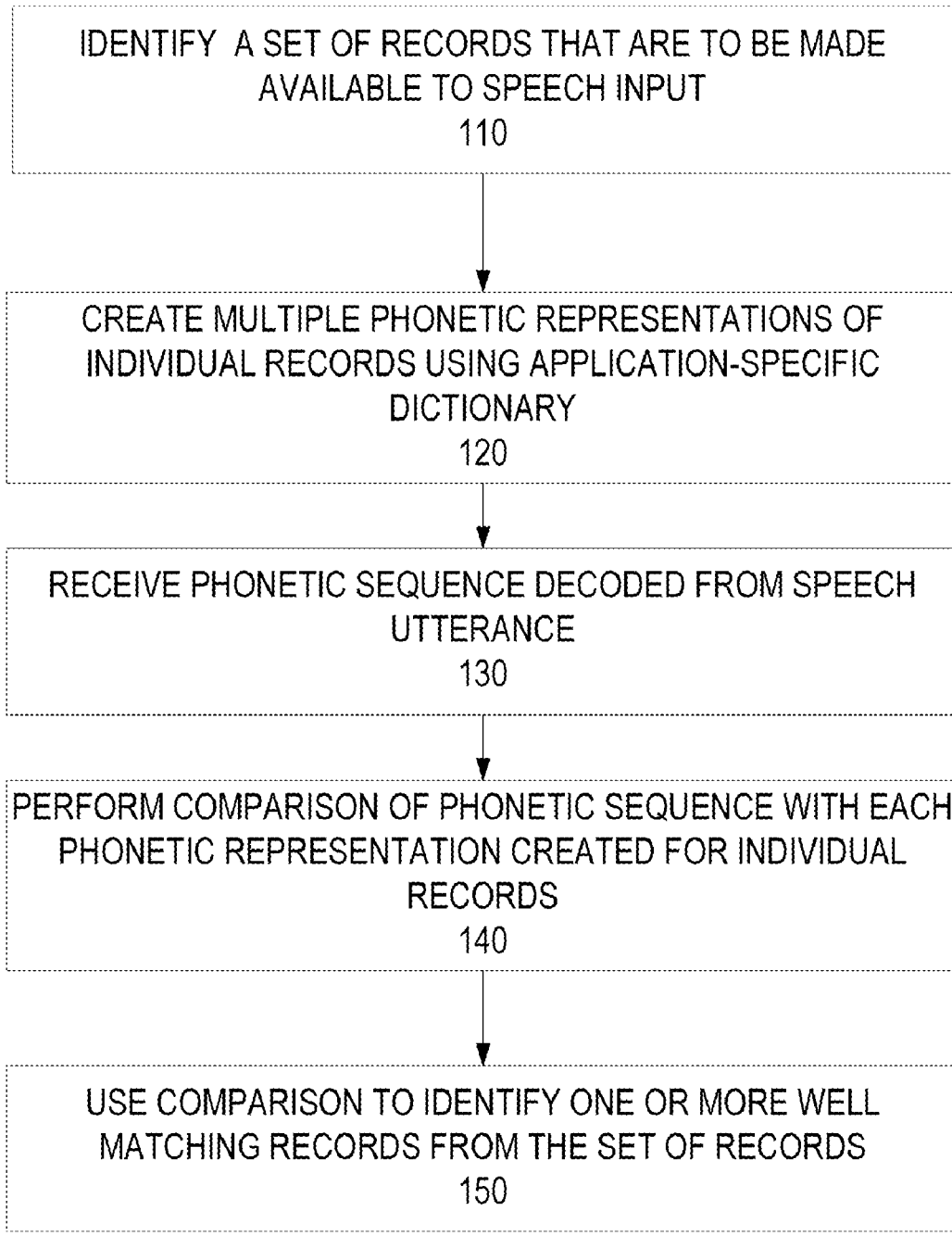
FIG. 1 illustrates a basic method to accommodate variations in an application where search or retrieval is performed for persons who use spoken utterances to provide the criteria for the search/retrieval, under an embodiment of the invention.

Embodiments described in this application provide a system, method and technique for accommodating variations in spoken utterances when such spoken utterances are to identify records. In the context of a search or retrieval application, an embodiment accommodates variations in how the user generates a search term using spoken utterances, so as to increase the likelihood that the record identified from the user's search request is the record that the user wanted.

One or more embodiments include an application-specific dictionary for use in recognition of spoken input. The dictionary includes a plurality of entries, where each entry matches to one or more items that comprise one or more records of a record store. For at least some of the plurality of entries, each entry has multiple phonetic representations, including one or more phonetic representations that are at least one of (i) an abbreviation of that entry, or (ii) a null use of the entry when that entry is combined with another entry.

An entry may include a word, name, phrase, an identifier (e.g. name of person or street) or other string of characters that has a meaning or significance. In the context of a database record, for example, an entry may correspond to words or characters that comprise a portion of the record (e.g. a column value or portion thereof).

In another embodiment, speech recognition is performed by identifying a plurality of entries from a sequence of phonetic units that are recognized from a spoken input. The plurality of entries individually match to one or more items that comprise one or more records of a database. A search node for the database is accessed. In an embodiment, the search node includes, for each record of at least some of the plurality of records, multiple phonetic representations, including at least one phonetic representation that contains at least one of (i) an abbreviation of an entry that comprises the record, or (ii) a null use of an entry that comprises the record when that entry is combined with another entry. A matching record of the database is then selected from the search node for the spoken input,. In selecting the matching records, the plurality of entries identified from the spoken input are compared to the phonetic representations of the individual records, including to the multiple phonetic representations that are provided for some of the records.

One specific use contemplated by an embodiment of the invention is a name directory phone or address book directory for which a speech-interface is provided. In such an application, numerous possibilities exist for how individual users may identify a person of interest. For example, a user may request a phone number for a person whom he identifies by surname and forename, or surname only. Embodiments of the invention enable one or more candidate results to be determined even in the presence of such variations, without the need for having to check every possible combination in the database that contains the records.

Any list, or database of records, (names of businesses, tax identification information, street or map information) may be suitable applications for embodiments of the invention, particularly those containing proper nouns and related information. Many embodiments described in this application are described in the context of a name directory (e.g. address book, white/yellow page type, or phone directories) for purposes of illustration. Other embodiments described herein may be implemented in the context of a media file library, in which individual files contain media data corresponding to audio/visual works (e.g. music, videos). Still further, one or more embodiments may be implemented in the context of command control, including phrases that may be used to control, for example, a robot, or as input to an automatic translation system.

Various embodiments described herein may be implemented programmatically, in whole or in part. As used herein, the term "programmatically" means through the use of code, or computer-executable instructions.

As described, in one application, embodiments provide that incoming speech is converted to an electrical waveform by a microphone and digitized using an A/D converter. The resulting digital signal is passed to a phonetic speech recognizer, which produces a sequence or lattice of phonetic symbols. (For simplicity of description, the output from the phonetic decoder will be henceforth called a sequence, but it should be understood that this includes the possibility of its being a lattice.) This sequence is passed to a search module where it is matched against the lattices of expected phonetic reference units corresponding to items in the lists. The lattices of expected phonetic reference units are generated by accessing a pronunciation dictionary.

For this arrangement to work well, users must produce a sequence of words that corresponds to one of the expected pronunciations of the intended item. In practice, users may well omit or modify components, reorder components or insert additional components relative to the basic expected form. It is consequently important that a system offering spoken access to lists should be able to cope with the most frequent variations of these kinds.

In this application, one or more embodiments described herein may be implemented using module or software components. A module or software component may include a program, a subroutine, a portion of a program, or a software component or a hardware component capable of performing one or more stated tasks or functions. As used herein, a module or software component can exist on a hardware component such as a server independently of other module or software components, or a module or software component can be a shared element or process of other module or software components, programs or machines. A module or software component may reside on one machine, such as on a client or on a server, or a module or software component may be distributed amongst multiple machines, such as on multiple clients or server machines.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Basic Methodology

FIG. 1 illustrates a basic method to accommodate variations in an application where search or retrieval is performed for persons who use spoken utterances to provide the criteria for the search/retrieval, under an embodiment of the invention.

A method such as described may be implemented through a system comprising one or more computers, and a speech interface for use by different users. An example of a suitable environment for implementing a method such as described by FIG. 1 is illustrated with FIG. 4.

Step 110 provides that a set of records are identified, where each record in the set is to be made available to search and retrieval operations in which a user specifies a criterion for selecting the record through a spoken utterance. For example, a database of records that correspond to a phone book may be used in the context of a speech-based search and retrieval system. Alternatively, the database records may hold media file information, such as artist, title, song/album name, or genre, or a list of phrases that may be used to control, for example, a robot or as input to an automatic translation system.

In step 120, multiple phonetic representations of individual records are created. The phonetic representations may be generated using instructions, rules, or logic (collectively referred to as "rules") that are associated with an application-specific dictionary that is to contain the phonetic representations. For a given application, the rules of the application-specific dictionary specify or accommodate variations in how a given record or portion of a record may be spoken. As another example, the rules associated with the application-specific dictionary anticipate the different ways an element of a record may be spoken. Using the rules, multiple phonetic representations are created for each record to anticipate the variations that may occur, for reasons such as the speech access is to be provided to a general population.

Once the multiple phonetic representations are created, the database or structure containing the phonetic representations of each record may be used. In step 130, a sequence of phonetic units may be decoded from the utterance of a user. Step 140 provides that a comparison is performed between the decoded phonetic sequence and the database of phone representations. Specifically, the phonetic input may be compared against each set of multiple phonetic representations that are provided for each record. The result of performing the step may be that a record is identified that has the highest determined likelihood of being what the user desired. Alternatively, the result may be in the form of a list of records, including a list using likelihoods for some number of best-matching records in the database, or a list including all matching records. (Again for simplicity of description it will henceforth be assumed that only the single most likely record is selected.) In step 150, the identified record is retrieved from the set of records (as used in step 110) and then returned to the user.

One implementation for an embodiment such as described by FIG. 1 is in the context of white pages or other phone book. In the case of U.S. names and addresses, the canonical form of a record may correspond to:

Forename—surname—building number—street name—city—state—ZIP code

Usage by different people may provide variations. For example, in the case of the name, a user might replace the forename by the corresponding initial, by an abbreviation or alternative/alias form (e.g. "Steve" for "Stephen", "Bob" for "Robert") or leave it out altogether. To further the example, a user may add a title, such as, "Mr, Mrs, Miss" or "Ms"; and the user may reverse the order of the forename and surname, military style (more common in some non-English languages). For the address, a user may omit in the utterance a building number. Similarly, with large cities, the state may be considered so obvious as to be redundant and hence be omitted. Finally, in US street names, the generic part of the street name ("Road, Street, Avenue, Drive," etc.) is often omitted.

A method such as described with FIG. 1 and elsewhere in the application accommodates the variations that may occur as a result of the sheer number of users, the local or geography covered by the application, the numerous conventions that users may have in specifying names and addresses, and other variations that come from normal use of a list or database made available to spoken access.

Figure 2B:
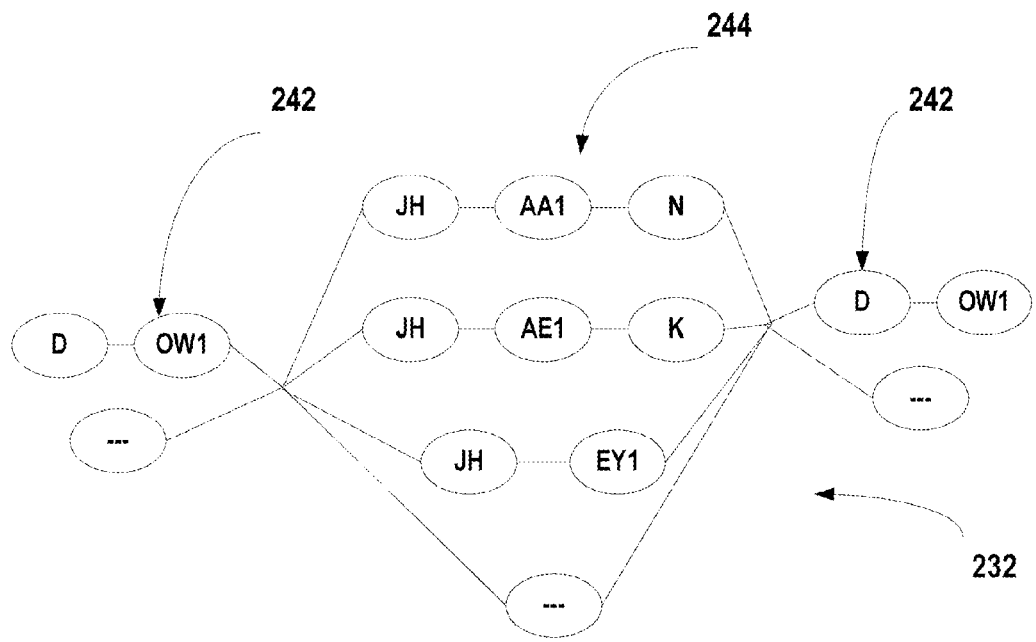
FIG. 2B illustrates an implementation in which the set of multiple phonetic entries are represented and used as a phonetic network entry, under an embodiment of the invention.
Figure 2A:
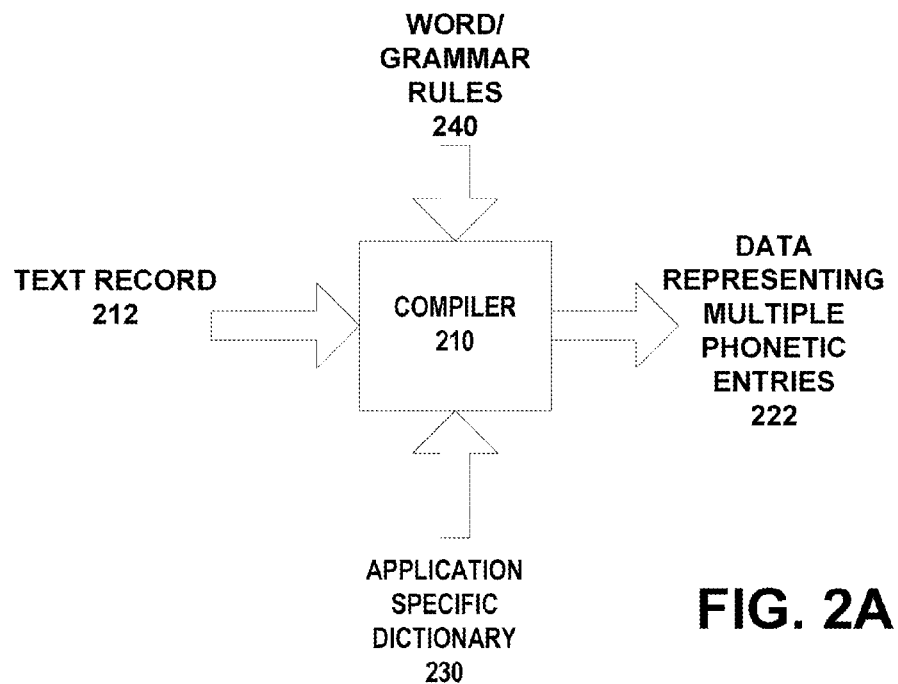
FIG. 2A is a data flow diagram illustrating the creation of a network entry comprising multiple phonetic representations of a single text record, under an embodiment of the invention.

FIG. 2A is a data flow diagram illustrating a technique for generating a searchable database for matching associating individual text records with multiple phonetic entries, under an embodiment of the invention. In FIG. 2A, a compiler 210 takes a text record 212 from a text database (not shown) or other data structure and identifies entries and data items that comprise the record. The entries may correspond to words, phrases, identifiers or field values that comprise the individual record. For each record 412, the compiler 210 generates data representing multiple phonetic representations of that record. The multiple phonetic representations are generated by identifying the variations to the spoken use of individual entries that comprise the record. In order to identify the variations to the spoken use of individual entries, dictionary 230 is used. Dictionary 230 may be constructed or tailored to a particular application with rules and directives that identify possible spoken variations to a given entry that is found from a record. As described elsewhere, the variations may accommodate omission of the entry, abbreviation of the entry, substitution of the entry for an orthographic dissimilar alternative, or alternative sequencing of the entry. For example, entries of records 212 that are forenames may each have the variation of an abbreviation, a null use, and a nickname/alias. Entries that are surnames may lack these variations, but the surname and forename may be interchangeable in sequence when spoken. In this way, two or more phonetic representations may be provided for each text record 212. The data representing the phonetic representations may be, for example, in the form of ASCII characters, which are themselves represented as binary digits.

In generating the set of multiple phonetic representations 222, the compiler 210 uses the application-specific dictionary 230. One or more embodiments further contemplate use of a set of word/grammar rules 240. The application-specific dictionary 230 models the construction of the set of multiple phonetic representations 222 for individual records 212, based on the entries that comprise those records. In a given application (e.g. name directory), the dictionary 230 may be configured to dictate how individual entries may be used in different records of the phone directory. One set of multiple phonetic representations 222 may correspond to multiple combinations of a single record. The compiler 210 makes use of the application-specific dictionary 230 in generating the set of multiple phonetic representations 222 for any given record 212.

Additionally, the compiler 210 may use a set of word/grammar rules 240 to create some of the phonetic representations for a given record 212. The word/grammar rules 240 may correspond to a set of generic, non-application-specific rules. For example, the word/grammar rules may dictate alternative ways in which a word, proper name or number may be pronounced, with the same orthography.

As an example of how an embodiment such as shown by FIG. 2A may be differentiated over the prior art, the publicly available and well-known pronouncing dictionary developed at Carnegie Melon University represents the pronunciation of the word "John" with the entry: JOHN JH AA1 N. For some entries, alternative pronunciations are supplied (for example, for the entries "READ" and "EITHER"). However, all pronunciations correspond directly to the orthography with which they are associated in the entry. FIG. 3A represents the structure and phonetic representations created under a prior art dictionary. Each entry in a name column has correspondence to an orthographical representation of the name. For each orthographical representation, one or more phonetic representations exist in the phonetic representation column that directly correspond to the orthographical representation.

By contrast, the application-specific dictionary is generated or configured to allow variations in the input. In one embodiment, dictionary 230 provides for the possibility of additional pronunciations that do not correspond directly to the orthography of a given entry (or record in conical form), but rather correspond to possible spoken inputs that differ orthographically from the given entry or record. Due to convention or other rules, these entries may have the same semantic meaning, even though they differ from the orthographic representation of that entry.

FIG. 3B and FIG. 3C illustrate a small portion of an application-specific dictionary, constructed under an embodiment of the invention. FIG. 3B and FIG. 3C illustrate how an application-specific dictionary 300 provides multiple representations for a given entry. In particular, FIG. 3B illustrates phonetic representations 312 that can be created for a given entry 310 ("John"). The entry 310 of "John" may be provided with multiple phonetic representations 312, based on rules and directives applied with the dictionary 300. "John" may be replaced by the nickname "Jack", by the initial "J." or it may be omitted completely when its use is as a forename (but not as a surname). As such, in the application specific dictionary 300, the entry of "John" may be provided with the following alternative pronunciation specifications:

JOHN JH AA1 N
JOHN JH AE1 K
JOHN JH EY1
JOHN — where the "—" signals a null pronunciation, that is, omission of the word.

The example provided above addresses situations when the forename is "John". Thus, in the name directory application, numerous other rules may provide for phonetic representations of a given entry that address the use of the given entry as a middle name, surname, or in other contexts in which a name is ordered or permuted. For example, with names, some people may use titles (e.g. "Mr.", "Mrs." Etc.), permutations of forenames names (e.g. initial only, nickname), and alternative conventions where forenames and surnames are pronounced first. In some cases, some entry for a name may not have a null pronunciation (not spoken at all). An application-specific dictionary such as described by one or more embodiments may accommodate such variations.

In one embodiment, the application-specific dictionary 300 addresses three categories of variations: (1) omissions, (2) substitutions (i.e. orthographically different variations such as an alias or nickname), and (3) permutations. In the example of the name directory, an omission may correspond to the speaker omitting a forename, and stating only the surname. The substitution may correspond to, for example, the user speaking "Jack" for "John". Permutations may also be accommodated by markers or other indicators. Permutations may address the scenario where one speaker uses surname first, while another speaker may use forename first.

In an embodiment, the variations allowed can be made specific to the function of the entry 310 as a word and/or identifier. In the "John" example, for instance, the pronunciations shown above would be specifically marked to apply to the word when functioning as a forename. As shown by FIG. 3C, for example, dictionary 300 may include a marker or other indicator such as "_FN_" to denote the use of the phonetic representation of the entry as a surname (or other designated use, such as in a street address etc.). The word "John" as a surname (as in the artist Augustus John) cannot be replaced by the nickname "Jack", nor in the intended application can it be replaced by the initial "J." or omitted completely. Thus the entry for "John" as a surname might appear as:

_SN_ JOHN JH AA1 N where the marker _SN_ indicates that this is the appropriate pronunciation when the word "John" occurs as a surname.

An optional entry (not shown) for title, normally being one of Mr, Mrs, Miss and Ms, may be made specific to the gender and possibly marital status of the person being named, if this information is available. Often, however, it is not available. In this case, a generic entry may be used, termed Title, which can have assigned to it phonetic representations corresponding to pronunciations of Mr, Mrs, Miss and Ms, as well as Dr, Rev, Prof, etc, if desired, together with the null pronunciation to allow the title to be omitted.

Other optional entries listed above, such as building numbers, generic parts of street names, and state names, can be treated in the same way by having one of the pronunciations in the application-specific dictionary be the null pronunciation.

It may also be desirable to label the semantic function of individual entries. For example, the word "Washington" may be marked as possibly omitted by making one of its pronunciations null when it represents the state of Washington in an address application in which the state may be optionally omitted, but ideally should not have a null pronunciation when, for example, it occurs as a surname. Washington as a state should therefore be labelled in the dictionary as distinct from other uses of the word "Washington". Similarly, the word "circle" may be given a null pronunciation when it is the generic part of a street name such as "Washington Circle", but ideally it should not be given a null pronunciation when it is a non-generic part of a street name, as in "Circle Street".

The example provided above provides for the efficient representation of deletions and substitutions of components. There remains the case of reordering of, for example, entries that can alternatively be used as the forename and surname.

With some small increase in ambiguity, reordering can be handled in the same way as the other variations. To allow, for example, the forename to be spoken before or after the surname, it is simply necessary to have it appear in the name-and-address item both before and after the surname. This arrangement allows the basic name John Smith to be matched not only to the intended forms such as: John Smith, J. Smith, Jack Smith, Smith John, Smith J., Smith Jack and Smith, but also to unintended forms such as John Smith Jack, J. Smith J., etc. The likelihood of unintended forms being used is small. However, their existence makes it theoretically more likely that some other name might be wrongly recognized as corresponding to the basic form John Smith. For example, the spoken form "John Smithson" might match misleadingly well to the unintended form John Smith John. In practice, the redundancy in information in the combination of a name and an address means that the additional unintended forms do not cause a serious problem.

In an alternative formulation, the surname rather than the forename is given an alternative null pronunciation and is placed in a grammar before and after the forename.

FIG. 2B illustrates an implementation in which the set of multiple phonetic entries 222 are represented and used as a phonetic network entry 232. In an embodiment such as described with FIG. 2A, phonetic network entry 232 is a phonetic record containing multiple possible phonetic representations of the text record 212. In this context, phonetic network entry 232 is a record that comprises multiple data elements 242, 244 tied together through alternative logical operators or equivalents. In the example provided, phonetic network entry 232 accommodates omissions ("—"), permutations (e.g. "Doe, John" and "John Doe" as phonetic representations) and substitutions ("Jack Doe"). Data elements may correspond to, for example, forename, middle name, surname, and null. Different alternatives of how the forename, middle name, surname may be arranged, with inclusion of the null, may represent one network entry 232. Thus, the network entry 232 permits multiple matching inputs using one set of data elements.

According to one embodiment, a speech utterance is matched to the phonetic representations of all the entries in the list and the best match, i.e. the most likely entry is found. The representation of the phonetic entry as the phonetic network 232 facilitates locating the entry. Thus, the record containing the phonetic network 232 which best matches the speech input may point to another text record which is provided back to the user as the result.

Figure 4:
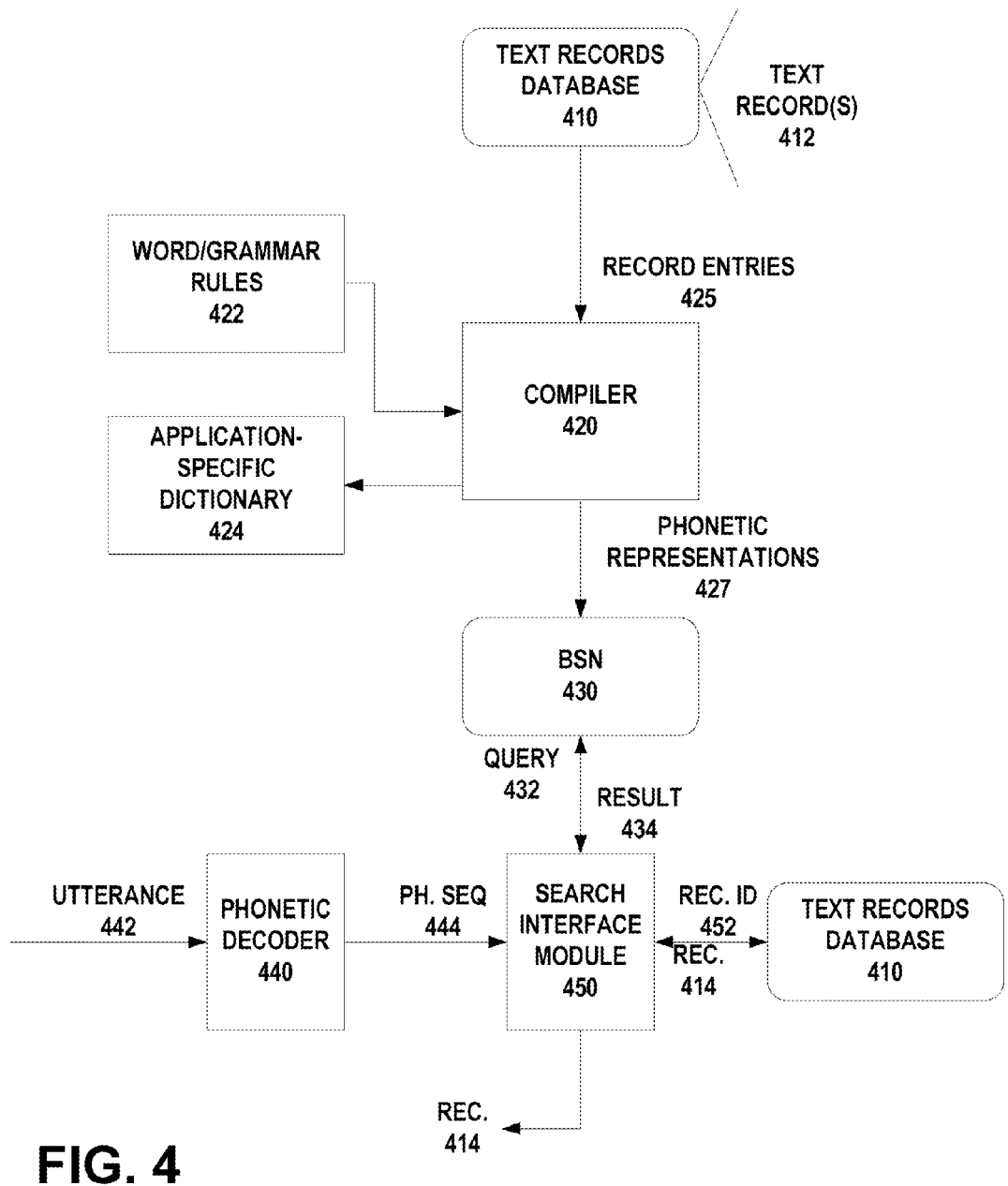
FIG. 4 illustrates a system for building and using a searchable database comprising data representing multiple phonetic entries of individual text records, under an embodiment of the invention.

FIG. 4 illustrates a system for building and using a searchable database, under an embodiment of the invention. A system as shown provides a searchable database for which multiple phonetic records are provided for individual text records based in part on the use of an application-specific dictionary. In FIG. 4, the system includes an offline build subsystem having components for building the searchable node, and an online search subsystem for using the searchable database to enable the phonetic search of records. The build subsystem uses raw data retrieved from a text records database 410. The text records database 410 may comprise numerous records in text form. In, for example, the application of a name directory, the records of text records database 410 include first and surname of individuals, and other information, such as phone numbers or addresses. The build subsystem operates offline to generate a searchable database of phonetic representations that comprise an application-specific dictionary 424, word/grammar rules 422, and a compiler 420. Individual records 412 are retrieved by the compiler 420 from the text records database 410. The compiler 420 identifies entries/data items 425 that comprise the records 412 (e.g. forename, surname, middle name, street address name, city/location identifier, phone numbers, numeric identifiers, and other items constituting personal identifiable information). The compiler 420 uses the dictionary 424 to generate phonetic representations 427 of individual records 412, based on the entries 425 identified from those records 412. In this way, the compiler 420 generates multiple phonetic representations 427 for individual records, according to rules and principles described above as they apply to entries that comprise the records. Each phonetic representation 427 is in the form of binary data, which is then stored in a binary search node 430. The binary search node 430 becomes the searchable database when the system goes online. In addition to building multiple phonetic representations of records, the compiler 420 may also associate a pointer for identifying the record from the search node 430.

The online search subsystem includes a phonetic decoder 440, and search interface module 450. The phonetic decoder 440 may process a spoken utterance of a user, and recognize the utterance 442 as a sequence of phonetic units. A phonetic sequence 444 is outputted from phonetic decoder 440 to the search interface module 450. The phonetic sequence 444 may be in the form of binary data, or converted to such by the search module 450. The search module 450 generates a query 432 for the BSN database 430. The search interface module 450 uses the query 432 to identify one or more phonetic entries 427 that are the best matches. The result 434 is obtained, containing identifiers of records in the text database

410. The search interface module 450 uses record identifiers 452 contained in the result 434 to retrieve one or more corresponding records 414 from the text records database 414. The search interface module 450 may then output the record 414 to the user. For example, the contents of the record 414 may be displayed on a display viewed by the user, or submitted to a text-to-speech converter which then transmits the contents of the identified record 414 as audio.

Embodiments such as described above may be employed in various contexts. For example, the system may be employed in part of a data network, such as provided by the public switching telephony system (PSTS) or Internet. A user may communicate with the searchable database by phoning a service at which the searchable database is provided. The utterance 442 may be converted at the service, and the text record 412 that best matches the user's spoken request is returned via display or audio data. In one usage scenario, the speaker is on a cellular phone, using a map, name directory, or address book. In another usage scenario, the speaker dials a phone service for attractions in his area. In still another usage scenario, the user retrieves music or video files using speech input.

In yet another usage scenario, the system is completely local and contained in one place. For example, the system described with FIG. 4 may be contained within a vehicle as part of its navigation system. The utterance of the user may correspond to a request for location information, for driving instructions, etc. The record returned may actually correspond to information contained by the record, and it may identify a place, street address or multiple street addresses. In such an example, data input may be supplemented with location information, such as provided through a Global Positioning System. Numerous other applications are contemplated for use with embodiments described herein.

Alternative Embodiments and Implementations

While numerous examples described above provide details for how embodiments may be implemented in the context of a name directory, other usages and implementations are contemplated with other embodiments. Under one embodiment, for example, an application-specific dictionary is provided for enabling creation of phonetic representations that correspond to commands from a command library. In a command library, a database of records may correspond to commands that can be used to control a programmatic component, such as a robot. Commands may be provided as single words, phrases, or combination of command/words. For example, some records may correspond to single-word records, such as "stop" or "pause", while others may correspond to multi-word commands, such as "fetch tool". In such an application, one or more embodiments contemplate a dictionary that can be used to create multiple phonetic representations of individual entries, in which individual entries correspond to a word or phrase that comprises at least a portion of a command. For a given entry, the dictionary may be used to create multiple phonetic representations that include one or more of the following: (i) alternative pronunciations that are orthographically similar, but pronounced differently from the given entry, and (ii) alternative pronunciations that are orthographically dissimilar, but semantically equivalent ("stop" and "wait") to the given entry.

In the latter case, semantic equivalence may be designated by convention of use, such as obtained from observation, knowledge or reference. For example, it may be observed that field operators commonly use "wait" to mean "stop". In addition to convention, standard language references may be used to compile semantic equivalence. For example, a Thesaurus may be applied to certain entries for alternative phonetic representations ("cease" for "stop").

In addition, abbreviations and null uses of entries are contemplated. For example, the command record may correspond to "fetch tool", but one of the phonetic representations that can be created from the dictionary corresponds to just "fetch" or "tool". A semantically equivalent entry, such as "get the tool" may also be used. Still further, one or more embodiments provide for use of abbreviations for words that are included in the command record. For example, the dictionary may enable the phonetic representations of "FTool" or "FT" to be provided for the command record of "fetch tool".

In addition, the dictionary may allow for phonetic representations of entries that ignore spoken use of certain words, so as to enable, for example, superfluous words that may be included in spoken input to be ignored. For example, a record for a command may correspond to "stop", but the user may say "stop it" or "please stop now". Thus, the dictionary provides phonetic representations that enable some words or commands to be ignored.

Under another implementation, an application-specific dictionary is provided for enabling creation of phonetic representations that correspond to language translations. Words or phrases of a target language may be maintained in records that are then matched to entries of a language in which the spoken input is received ("source language"). Each entry may correspond to a word or phrase that corresponds to or is included in a target language record. An embodiment provides for use of an application that includes multiple phonetic representations for individual entries of the source language, wherein the individual entries are, when translated, included in the target language record. For a given entry, the phonetic representations may include (i) a canonical phonetic representation of the given entry; (ii) a phonetic representation in which the given entry, or a word or portion of that entry is abbreviated; (iii) a phonetic representation in which a null use is allowed for the given entry, or a word of that entry; and (iv) a phonetic representation in which semantic equivalent terms or words or provided for the given entry. The spoken input for the given entry may then be varied by what is allowed for with the phonetic representations that correspond to the given entry.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for performing speech recognition, the method being performed by one or more processors that perform steps comprising:
   identifying a plurality of entries from a sequence of phonetic units that are recognized from a spoken input, wherein the plurality of entries individually match to one or more items that comprise one or more records of a database that comprises a plurality of records;

accessing a search node for the database, wherein the search node includes, for each record of at least some of the plurality of records, multiple phonetic representations, including at least one phonetic representation that contains at least one of (i) an abbreviation of an entry that is included in the record, or (ii) a null use of an entry that is included in the record when that entry is combined with one or more other entries; and selecting, from the search node, a matching record of the database for the spoken input, wherein selecting the matching record includes comparing the plurality of entries identified from the spoken input to the phonetic representations of the individual records, including to the multiple phonetic representations of records in the at least some of the plurality of records.

2. The method of claim 1, identifying a plurality of entries from a sequence of phonetic units that are recognized from a spoken input includes identifying one or more names, and wherein accessing the search node includes accessing the search node for a directory of people and/or businesses.

3. The method of claim 2, wherein identifying a plurality of entries includes identifying a nickname or alias as one of the plurality of entries that are recognized from the spoken input, and wherein selecting a matching record further comprises selecting a given record in which at least one of multiple phonetic representations includes the entry for the nickname or alias, and wherein the nickname of alias is orthographically dissimilar to a corresponding name contained in the matching record.

4. The method of claim 1, wherein identifying a plurality of entries from a sequence of phonetic units includes ignoring an entry corresponding to a title of a person.

5. The method of 1, wherein selecting the matching record includes selecting the matching record in which two or more of the entries that comprise the record have a canonical arrangement that is different than a sequence of spoken entries that are determined to correspond to the two or more entries.

6. The method of claim 5, wherein the sequence of entries that are determined to correspond to the two or more entries include an abbreviation of one of the two or more entries.

7. The method of claim 1, wherein accessing a search node includes accessing the search node for a media library of audio or visual works, and wherein the plurality of records that comprise the media library include one or more entries selected from a group consisting of (i) song title, (ii) artist name, (iii) genre of audio visual work, and (iv) file name.

8. A computer-readable medium that stores instructions for performing speech recognition, the instructions including a set of instructions, that when executed by the one or more processors, cause the one or more processors to perform steps comprising:

identifying a plurality of entries from a sequence of phonetic units that are recognized from a spoken input, wherein the plurality of entries individually match to one or more items that comprise one or more records of a database that comprises a plurality of records;

accessing a search node for the database, wherein the search node includes, for each record of at least some of the plurality of records, multiple phonetic representations, including at least one phonetic representation that contains at least one of (i) an abbreviation of an entry that is included in the record, or (ii) a null use of an entry that is included in the record when that entry is combined with one or more other entries; and selecting, from the search node, a matching record of the database for the spoken input, wherein selecting the matching record includes comparing the plurality of entries identified from the spoken input to the phonetic representations of the individual records, including to the multiple phonetic representations of records in the at least some of the plurality of records.

* * * * *